UNITED STATES PATENT OFFICE.

ELMER A. SPERRY, OF CHICAGO, ILLINOIS.

VITRIFIED ASBESTUS.

SPECIFICATION forming part of Letters Patent No. 343,651, dated June 15, 1886.

Application filed March 21, 1884. Renewed May 8, 1886. Serial No. 201,599. (No specimens.)

*To all whom it may concern:*

Be it known that I, ELMER A. SPERRY, a citizen of the United States, residing at Chicago, in the county of Cook and State of Illinois, have invented certain new and useful Improvements in Vitrified Asbestus; and I do declare the following to be a full, clear, and exact description of the invention, such as will enable others skilled in the art to which it appertains to make and use the same.

The invention relates to an improved article of manufacture; and it consists in treating asbestus, preferably in form of sheets or fabric, by a solution of silicon in the form of sodium or potassium silicates in hydrated solution. These materials are heated by steam or other suitable means, and the fabrics or sheets of asbestus or Limogenous asbestus fiber is immersed therein until thoroughly saturated by the solution, when it is removed and passed through rollers gently heated, driven rapidly by power or otherwise, or any analogous method of driving out the superfluous silicate. The sheets, fabric, or fiber thus treated are then dried by gentle heat. This treatment renders this material hard and bone-like, offering considerable resistance to flexure.

Another advantage of the material treated in this way is that its resistance to electric potential is increased materially and the substance is at the same time prevented from absorbing moisture from the atmosphere.

Should the above process be found not to give the desired rigidity it may be repeated, or a hot solution may be applied on the exterior by means of a brush. The substance even when used cold gives good results.

Should it be desired to hold the substance thus treated in any form or shape, two (2) thicknesses of paraffined paper, one laid upon the form and one laid upon the blank, are found of service to prevent adhesion. Such molds are found to give better results when heated.

A cold solution is found to glaze the surface. This product may be applied to perform the office of insulation of electrical conductors upon machines, generators, lamps, storage-cells, batteries, telegraph and telephone instruments, switch-boards, and like apparatus with highly satisfactory results, especially to electrical conductors where a high degree of heat is attained, as the insulating qualities of the new product are unaffected even at very high temperatures, no chemical change taking place, as in the case of fiber, vulcanite, woods, or even ivory, where carbon is always formed, thus destroying their insulating qualities. This, together with its non-absorption of moisture from the atmosphere and its perfect resistance to all electrolic actions, even when subjected to most acids, renders it a highly desirable substance as an insulator.

What I desire to claim is, as a new article of manufacture—

1. Asbestus fiber in the form of sheets or fabric treated with potassium or sodium silicates in hydrated solution by being immersed therein until such solution has impregnated either partially or wholly the removing superfluous silicates from said material, and allowing same to dry, in the manner and for the purposes substantially as specified.

2. As a new article of manufacture, asbestus fiber or fabrics treated by being impregnated with potassium or sodium silicates in hydrated solutions, and afterward removing the hydrate or water and leaving the silicates interdispersed together and among the silicious fiber of the asbestus material, substantially as and for the purpose specified.

In testimony whereof I affix my signature in presence of two witnesses.

ELMER A. SPERRY.

Witnesses:
GEO. C. CHRISTIAN,
A. D. SONTAG.